United States Patent [19]

Budzich

[11] 3,721,473
[45] March 20, 1973

[54] THREE SLOPE PROPORTIONING VALVE

[75] Inventor: Tadeusz Budzich, Moreland Hills, Ohio

[73] Assignee: The Weatherhead Company, Cleveland, Ohio

[22] Filed: Dec. 20, 1971

[21] Appl. No.: 209,761

[52] U.S. Cl. .................................................303/6 C
[51] Int. Cl. .............................................B60t 11/34
[58] Field of Search.......................303/6 C; 188/349

[56] References Cited

UNITED STATES PATENTS

| | | | |
|---|---|---|---|
| 3,669,507 | 6/1972 | Stokes | 303/6 C |
| 3,598,451 | 8/1971 | Doerfler | 303/6 C |
| 3,375,852 | 4/1968 | Milster | 303/6 C |
| 3,501,203 | 3/1970 | Falk | 303/6 C |
| 3,503,657 | 3/1970 | MacDuff | 303/6 C X |
| 3,306,678 | 2/1967 | Lepelletier | 303/6 C X |

*Primary Examiner*—Allen N. Knowles
*Attorney*—Harold F. McNenny et al.

[57] ABSTRACT

A three slope proportioning valve for a motor vehicle hydraulic brake system is disclosed. The valve is normally open to permit free fluid flow from the inlet port to the outlet port below a first predetermined inlet port pressure. At the first predetermined pressure, a differential area piston is displaced and engages a floating valve member to isolate the inlet port from the outlet port. The differential area piston and the valve member then move together to decrease the outlet port volume and maintain increases in outlet port pressure above the predetermined pressure in a first predetermined proportional relation to increases in inlet port pressure up to a second predetermined inlet port pressure level. At the second predetermined pressure, the floating valve member is stopped against further movement, and the differential area piston moves away from the valve member to establish throttled fluid pressure communication between the inlet port and the outlet port to maintain further increases in outlet port pressure in a second predetermined proportional relation to further increases in inlet port pressure.

7 Claims, 2 Drawing Figures

PATENTED MAR 20 1973

3,721,473

INVENTOR.
TADEUSZ BUDZICH
BY
McNENNY, FARRINGTON,
PEARNE & GORDON

ATTORNEYS 3,721,473

THREE SLOPE PROPORTIONING VALVE

BACKGROUND OF THE INVENTION

This invention relates generally to pressure regulating valves, and more specifically to pressure proportioning valves that are operable to maintain the outlet pressure a differential below the inlet pressure after a predetermined inlet pressure has been reached or exceeded. Still more specifically, this invention relates to such pressure proportioning valves that are particularly adapted for use in motor vehicle braking systems and are known as three slope pressure proportioning valves.

In automobile hydraulic brake systems, it is sometimes desirable to provide a lower fluid pressure to the rear wheel brakes than to the front wheel brakes under severe braking conditions. This prevents premature lock-up of the rear wheel brakes of the automobile, which might otherwise be caused by a weight transfer from the rear wheels to the front wheels upon rapid deceleration. Such premature lock-up of the rear wheel brakes of an automobile may also tend to result under certain conditions when caliper disc type brakes are used on the front wheels of the vehicle and drum type brakes are used on the rear wheels, due to the self-energizing action of the drum type brakes.

Prior art proportioning valves for providing this pressure differential include two slope proportioning valves and three slope proportioning valves. The two slope valves generally provide open fluid pressure communication between inlet and outlet below a predetermined pressure level, and provide a single proportional relation between increases in inlet pressure and increases in outlet pressure above the predetermined pressure. Three slope proportioning valves are similar to two slope valves, but further include means to maintain a second proportional relation between increases in inlet pressure and increases in outlet pressure after a second predetermined pressure level is reached. In this manner, the three slope proportioning valves are able to maintain the relation between front and rear wheel brake pressures closer to the theoretical optimum relation over the entire range of operation of the brake system.

SUMMARY OF THE INVENTION

The invention provides a simple, inexpensive, and reliable three slope pressure proportioning valve which is particularly adapted for use in a motor vehicle dual braking system to regulate the fluid pressure supplied to the brakes.

The preferred embodiment of this invention provides such a pressure proportioning valve which may be interposed in a hydraulic brake system between the master cylinder and the slave or wheel cylinders of the rear wheels. When the hydraulic pressures in the system are relatively low, such as would occur under very moderate braking conditions or during advancement of the brake shoes or pads toward the braking surfaces, the valve permits equalization of the outlet pressure supplied to the slave or wheel cylinders and the inlet pressure supplied from the master cylinder. When the system pressure increases above a first predetermined pressure level, such as would occur under more severe braking conditions, the invention provides a displacement type proportioning valve which isolates inlet pressure from outlet pressure and maintains a first proportional relationship between any further increases in the outlet pressure and any further increases in the inlet pressure supplied from the master cylinder until a second predetermined pressure level is reached. As used herein, the term "displacement type" proportioning valve refers to a proportioning valve in which an inlet port is isolated from an outlet port, and a floating barrier is moved toward the outlet to decrease the volume of the outlet port when make-up flow is required.

When the inlet pressure from the master cylinder increases above the second predetermined pressure level, such as would occur under very severe braking conditions, the invention provides a throttling type proportioning valve which establishes throttled fluid pressure communication between the inlet and the outlet to provide unlimited make-up flow to the slave cylinders from the master cylinder and to maintain a second predetermined proportional relation between any further increases in the inlet pressure supplied from the master cylinder and any further increases in the outlet pressure. As used herein, the term "throttling type" proportioning valve refers to a proportioning valve in which throttled fluid pressure communication is established between the inlet port and the outlet port to provide unlimited fluid flow between the inlet port and the outlet port.

According to other features and advantages of the invention, the valve includes a body having a bore therethrough with an inlet port at one end of the bore and an outlet port at the other end of the bore. As used herein, the term "inlet port" or "inlet" refers to all interior portions of the valve upstream of the valve throttling area, and the term "outlet port" or "outlet" refers to all interior portions of the valve downstream of the valve throttling area. A differential area piston is slidably disposed in the bore. A passage extends axially through the differential area piston, and the portion of the differential area piston surrounding one end of the passage forms an annular valve head. A shuttle piston is also slidably disposed in the bore to provide a floating valve seat.

When the first predetermined pressure is reached, the differential area piston valve head moves toward and engages the shuttle piston so that the differential area piston and the shuttle piston together form a differential area floating barrier between the inlet port and the outlet port. The floating barrier maintains further increases in inlet and outlet pressure in a first predetermined proportional relation until a second predetermined inlet port pressure is reached. When the second predetermined inlet port pressure is reached, the shuttle piston is stopped against further movement by engagement with a shoulder in the bore. The differential area piston valve head then cooperates with the shuttle piston to form a throttling valve which maintains further increases in inlet and outlet pressure above the second predetermined pressure in a second predetermined proportional relation.

DESCRIPTION OF THE PREFERRED EMBODIMENT

Figures 1, 2:
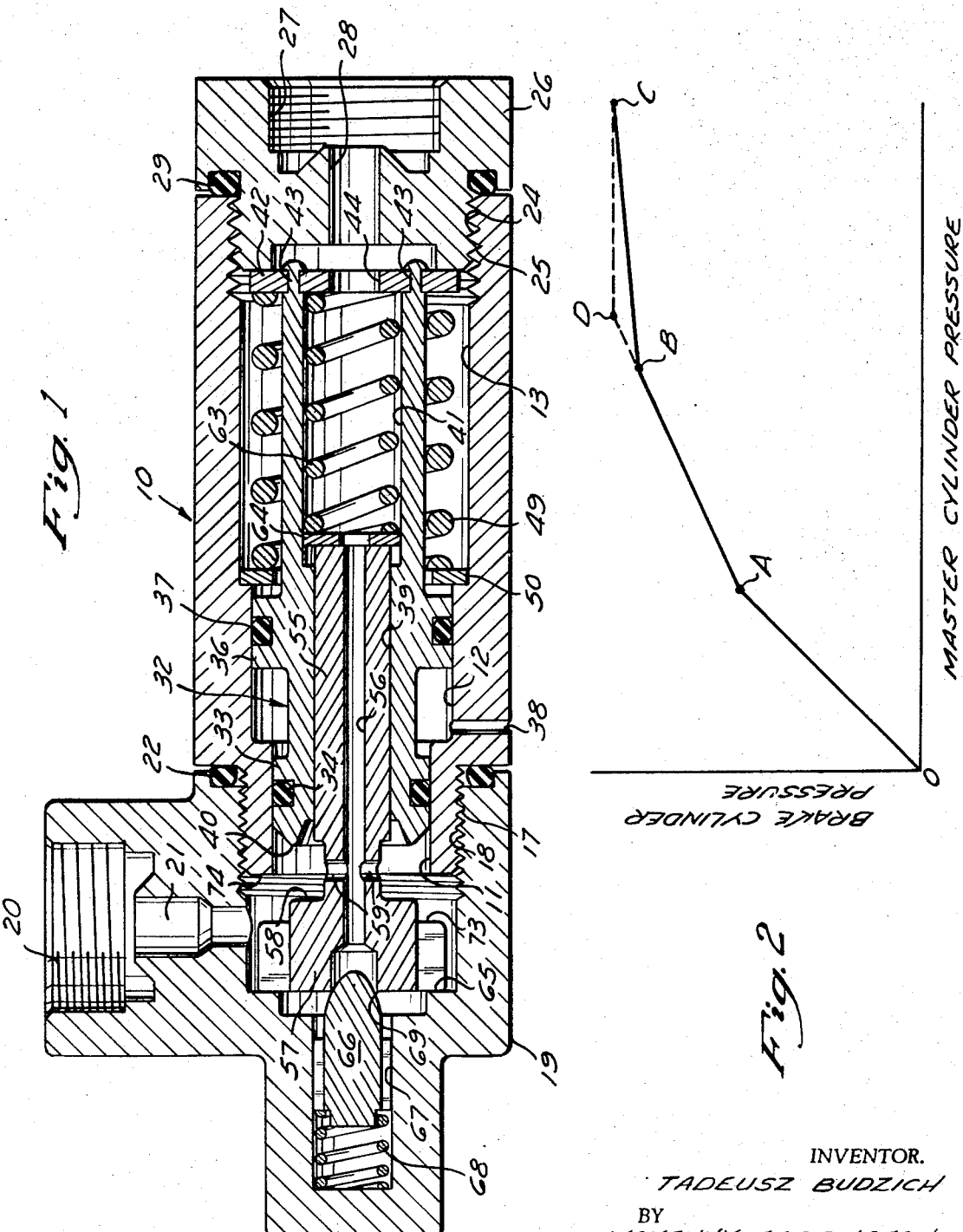
FIG. 1 is a cross sectional, side elevational view of a valve according to the preferred embodiment of this invention.
FIG. 2 is a graphical representation of the relationship between inlet and outlet pressures of the valve shown in FIG. 1.

Referring now to the drawings in greater detail, FIG. 1 shows a three slope proportioning valve which is particularly adapted for use in a motor vehicle dual braking system. When the valve is used for such purposes in an automobile, it is usually interposed between the brake system master cylinder and the hydraulic line leading to the slave or wheel cylinders of the rear wheels to regulate the fluid pressure supplied to the rear brakes.

The brake pressure proportioning valve according to the preferred embodiment of the invention includes a housing 10 having a bore 11 extending axially therethrough, a first counterbore 12, and a second counterbore 13. As viewed in FIG. 1, the left end of body 10 has an externally threaded end portion 17 which is threadably received by an internally threaded opening 18 of left end fitting 19. The left end fitting 19 includes a threaded inlet opening 20, which is adapted to receive an inverted flare type fitting to receive fluid pressure supplied from the master cylinder of the motor vehicle. A passage 21 establishes communication between the inlet opening 20 and the opening 18 through the left end fitting 19. Fluid leakage between the left fitting 19 and the body member 10 is prevented by an elastomeric O-ring seal 22.

The right end of body member 10, as viewed in FIG. 1, is provided with an internally threaded end portion 24 which threadably receives an externally threaded portion 25 of right end fitting 26. The right end fitting 26 is provided with a threaded outlet opening 27, and a passage 28 establishes open fluid communication between the outlet opening 27 and the second counterbore 13. Outlet opening 27 is adapted to receive an inverted flare type fitting to supply fluid pressure to the slave cylinders of the rear wheel brakes. An elastomeric O-ring seal 29 is provided between the body member 10 and the end fitting 26 to prevent fluid leakage.

A differential area piston 32 is slidably disposed within the body member 10. The differential area piston 32 includes a smaller diameter portion 33, which carries an O-ring seal 34 and is slidably and sealingly disposed in bore 11. A larger diameter portion 36 of the differential area piston 32 carries an O-ring seal 37 and is slidably and sealingly disposed in the first counterbore 12. The annular cross sectional area differential between the smaller diameter portion 33 and the larger diameter portion 36 is vented to atmospheric pressure by a suitable vent passage 38. A passage 39 extends axially through the differential area piston 32, and the annular portion of the differential area piston 32 surrounding the left end of the passage 39 provides an annular valve head 40.

The passage 39 of the differential area piston 32 extends from the valve head 40 to a larger diameter passage 41. The right end of differential area piston 32 carries a round, generally flat abutment plate 42. The abutment plate 42 is secured to the differential area piston 32 by suitable circumferentially spaced projections 43 and includes a fluid passage 44. A coil spring 49 acts between a washer 50 and the abutment plate 42 to normally bias the differential area piston to the right to the predetermined position shown in FIG. 1.

A shuttle piston or floating valve member 55 is slidably disposed within the passage 39 of differential area piston 32. The shuttle piston 55 is of generally tubular construction, and includes a passage 56 extending axially therethrough. The right end of the shuttle piston 55 provides a stem portion for guiding movement of the shuttle piston 55. Because the stem portion is disposed within the passage 39, it does not materially add to the overall length of the valve to thereby contribute to the overall compactness of the valve. In the preferred embodiment, the length of the stem portion which is received within the passage 39 is greater than two times the diameter of the passage 39 to prevent cocking of the shuttle piston 55. The left end of the shuttle piston 55 is provided with an enlarged diameter end portion 57. The enlarged diameter end portion 57 is notched or fluted to maintain open fluid pressure communication between the inlet opening 20 and the left end face of the shuttle piston 55. The right end face 58 of the end portion 57 provides a valve seat which cooperates with the valve head 40 in a manner described below. A radially extending passage 59 extends outwardly from the passage to the exterior portion of the shuttle piston 55.

A coil spring 63 acts between the abutment plate 42 and a washer 64 to urge the shuttle piston 55 to the position shown in FIG. 1 so that the fluted end portion 57 is spring biased against a shoulder 65 formed in the left end fitting 19. In the preferred embodiment, the spring 49 has a larger mean spring diameter than the spring 63, and the springs 49 and 63 are coaxially and concentrically disposed to further contribute to the compactness of the valve.

A return flow check valve 66 is slidably disposed in a bore 67 in the left end fitting 19. The check valve 66 is notched or fluted about its periphery adjacent bore 67 to provide open fluid pressure communication between the fluid pressure in the inlet opening 20 and the left end face of the check valve 66. A coil spring 68 biases the check valve 66 against a valve seat 69 formed at the left end of the passage 56 in the shuttle piston 55. The spring 68 is suitably arranged so that it applies a biasing force against the check valve 66 regardless of the position of the shuttle piston 55 and the valve member 66 as described in detail below.

In a preferred installation of the valve as shown in FIG. 1, the inlet opening 20 is hydraulically connected to the rear brake pressure outlet port of a dual brake system master cylinder in a motor vehicle. The outlet opening 27 is hydraulically connected to supply fluid pressure to the slave cylinders of the rear wheel brakes. When the brake system master cylinder is deactuated, or when the system pressures are very low such as would occur when the brake shoes are advancing toward the brake drums, the component parts of the valve are spring biased to the predetermined positions shown in FIG. 1 as described above. When the component parts of the valve are in these positions, open fluid pressure communication is established between the inlet opening 20 and the outlet opening 27 through passages 21, 59, 56, 44 and 28. During this portion of the operation of the valve, the inlet pressure and the outlet pressure of the valve are equal. This portion of the operation of the valve is shown graphically in FIG. 2 by the line OA.

As the inlet and outlet pressures are increasing along line OA, a differential force on differential area piston 32 tends to move the differential area piston 32 from the position shown in FIG. 1 toward the left against the bias of coil springs 49 and 63. This differential force is created by the fluid pressure acting upon the different effective cross sectional areas of the larger and smaller diameter portions 33 and 36. When this differential force is great enough to overcome the preload of springs 49 and 63, the differential area piston 32 moves to the left so that the valve head 40 engages the valve seat 58 to hydraulically isolate the inlet opening 20 from the outlet opening 27. This occurs at a first predetermined inlet opening pressure indicated at point A in FIG. 2. This portion of the operation of the valve is similar to that of the valve disclosed in U.S. Letters Pat. No. 3,623,776 to Ellis M. Wellman.

As the pressure in the inlet opening 20 supplied by the master cylinder increases above the pressure indicated at point A in FIG. 2, the differential area piston 32 and the shuttle piston 55 cooperate to form a floating barrier between the inlet opening 20 and the outlet opening 27 for maintaining isolation therebetween. Because the inlet opening 20 is hydraulically isolated from the outlet opening 27 by the valve head 40 and valve seat 58, the effective cross sectional area of this floating barrier exposed to inlet pressure is equal to the effective cross sectional area of the bore 11. The effective cross sectional area of this floating barrier exposed to outlet pressure is equal to the cross sectional area of the counterbore 12. As the pressure in the inlet opening 20 increases above the pressure indicated at point A, the proportional difference between these cross sectional areas of the floating barrier maintains a first predetermined proportional relation between further increases in inlet pressure and further increases in outlet pressure. During this portion of the operation of the valve, the floating barrier moves to the right as viewed in FIG. 2 to decrease the volume of the outlet port and provide make-up flow to the slave cylinders of the rear wheel brakes which may be required due to expansion of the hydraulic brake lines and deformation of the brake shoe structure. This portion of the operation of the valve as a displacement type valve is indicated by the line AB in FIG. 2.

As the floating barrier moves to the right as viewed in FIG. 1, a right end face 73 of the enlarged portion 57 will engage a shoulder 74 to prevent further movement of the shuttle piston 55 to the right. This occurs when the inlet and outlet pressures have reached point B as shown in FIG. 2.

When point B is reached, the operation of the valve changes from that of a displacement type valve to that of a throttling type valve in which throttled fluid pressure communication is established between the inlet opening 20 and the outlet opening 27. Because the inlet pressure is greater than the outlet pressure during this portion of the operation of the valve, the shuttle piston 55 will remain in its displaced position against the bias of spring 63 with its end face 73 engaging the shoulder 74 as the system pressures increase above point B.

As the inlet pressure supplied from the master cylinder increases above the pressure indicated at point B in FIG. 2, such increased inlet pressure acts on the annular area of the differential piston 32 between the bore 11 and the valve head 40. This urges the differential piston 32 to the right as viewed in FIG. 1. Because the outlet pressure is acting on the larger annular area of the differential area piston 32 between the counterbore 12 and the valve head 40, such increases in inlet pressure create a proportional but smaller increase in outlet pressure. This portion of the operation of the valve is indicated by line BC of FIG. 2, and is similar to the throttling operation of the valve disclosed in the above cited U.S. Pat. No. 3,623,776.

After point C has been reached and the pressure supplied to the inlet opening 20 from the master cylinder is subsequently decreased, the outlet pressure will remain substantially constant as the inlet pressure decreases until point D is reached which is the intersection of a horizontal or constant pressure line passing through point C and the extension of the line AB. This portion of the operation of the valve is shown graphically by line CD in FIG. 2. This is because the valve head 40 of the differential area piston 32 is held firmly against the valve seat 58 by the outlet pressure acting on the larger annular area of the piston 32 between the counterbore 12 and the valve head 40 as the inlet pressure decreases. This causes the pistons 32 and 55 to function again as a floating barrier between the inlet opening 20 and the outlet opening 27, and the floating barrier will not be displaced until the first predetermined proportional relationship between inlet and outlet pressure is again reached, which occurs at point D. The inlet and outlet pressures then decrease along straight line DBA by operation of the differential areas of the floating barrier. When point A is reached and the inlet pressure is further decreased, the outlet pressure forces the check valve 66 against the bias of spring 68. This permits the outlet pressure to decrease below the pressure indicated at point A so that inlet and outlet pressure will further decrease along line AO and the piston 32 will return to its spring biased position shown in FIG. 1.

If the master cylinder pressure supplied to the inlet opening 20 is decreased when the valve is operating at any point along line AB, the floating barrier consisting of pistons 32 and 55 will move back to the left to decrease the fluid pressures to point A along line AB. Any further decrease in inlet pressure will cause the return flow check valve element 66 to move away from the valve seat 69 so that the inlet and outlet pressures will decrease along line OA and the piston will return to its spring biased position shown in FIG. 1.

If the fluid pressure supplied to the inlet opening 20 is decreased before the system pressures indicated at point A of FIG. 2 are reached, the inlet and outlet pressures of the valve will decrease along the line AO, and the valve will not interrupt free fluid pressure communication between inlet and outlet.

Although a presently preferred embodiment of the invention has been disclosed and described in detail, it is recognized that various modifications may be made in structural details of the unit and it may be combined with other brake system devices including the master cylinder, warning switches and other system valves and

I claim:

1. A valve comprising a body having a bore therethrough, an inlet port at one end of said bore and an outlet port at the other end of said bore, a differential area piston slidably disposed in said bore, said differential area piston including differential area means, first valve member means and second valve member means slidably disposed in said bore, one of said valve member means being carried by said differential area piston, said first and second valve member means being separated to maintain free fluid pressure communication between said inlet and outlet ports when the inlet port pressure is less than a first predetermined pressure, said first and second valve member means engaging one another to isolate said inlet port from said outlet port when said first predetermined inlet port pressure is reached and to maintain said isolation until a second predetermined inlet port pressure is reached, said engaged first and second valve member means together providing a displaceable floating barrier to decrease the volume of said outlet port and maintain a first predetermined proportional relation between said inlet port pressure and said outlet port pressure when said inlet port pressure is greater than said first predetermined pressure and less than said second predetermined pressure, said first and second valve member means separating to establish throttled fluid pressure communication between said inlet port and said outlet port when said inlet port pressure reaches said second predetermined pressure to maintain increases in said outlet port pressure in a second predetermined proportional relation to increases in said inlet port pressure when said inlet port pressure exceeds said second predetermined pressure.

2. A valve comprising a body having a bore therethrough, an inlet port at one end of said bore and an outlet port at the other end of said bore, a differential area piston slidably disposed in said bore, said differential area piston including differential area means, said differential area means including a smaller diameter portion of said differential area piston sealingly engaging one portion of said bore and a larger diameter portion of said differential area piston sealingly engaging another portion of said bore, a first spring biasing said differential area piston to a first position in said bore, a passage extending axially at least partially through said differential area piston establishing open fluid pressure communication between said inlet port and said outlet port when the fluid pressure in said fluid inlet port is less than a first predetermined pressure, an annular valve head on said differential area piston surrounding said passage, a floating valve seat slidably disposed in said bore, a second spring biasing said floating valve seat to a second predetermined position, said differential area piston being movable from said first position to a third position in which said valve head engages said floating valve seat to close said passage and hydraulically isolate said inlet port from said outlet port, said valve head and said floating valve seat maintaining said isolation when said fluid inlet pressure is greater than said first predetermined pressure and less than a second predetermined pressure, said differential area piston and said floating valve seat being movable together from their respective said second and third positions to decrease the volume of said outlet port and maintain a first predetermined proportional relation between increases in said inlet port pressure and increases in said outlet port pressure when said inlet port pressure is greater than said first predetermined pressure and less than said second predetermined pressure by operation of said differential area means, said differential area piston being movable by operation of said differential area means away from said floating valve seat to move said valve head away from said floating valve seat and establish throttled fluid pressure communication between said inlet port and said outlet port through said passage means when said inlet port pressure exceeds said second predetermined pressure, and said differential area means maintaining increases in said inlet port pressure in a second predetermined proportional relation to increases in said outlet port pressure when said inlet port pressure exceeds said second predetermined pressure.

3. A valve as set forth in claim 2 including stop means in said bore for engaging said floating valve seat and limiting movement of said floating valve seat away from said second position.

4. A valve as set forth in claim 2 including check valve means for re-establishing open fluid pressure communication between said inlet port and said outlet port when said inlet port pressure decreases from a pressure greater than said first predetermined pressure to a pressure less than said first predetermined pressure.

5. A valve as set forth in claim 2 wherein said second spring means is a coil spring acting between said differential area piston and said floating valve seat.

6. A valve as set forth in claim 5 wherein said first spring means is another coil spring having a larger mean spring diameter than said first mentioned coil spring, and said first mentioned coil spring is coaxially disposed within said other coil spring.

7. A valve comprising a body having a bore therethrough, an inlet port at one end of said bore and an outlet port at the other end of said bore, a differential area piston slidably disposed in said bore, said differential area piston including differential area means, said differential area means including a smaller diameter portion of said differential area piston sealingly engaging one portion of said bore and a larger diameter portion of said differential area piston sealingly engaging another portion of said bore, a first spring biasing said differential area piston to a first position in said bore, a first passage extending axially at least partially through said differential area piston, an annular valve head on said differential area piston surrounding said first passage, a floating valve seat slidably disposed in said bore, said floating valve seat including a larger diameter seat portion and an axially extending smaller diameter stem portion, said smaller diameter stem portion being slidably disposed in said first passage for guiding movement of said floating valve seat, a second spring biasing said floating valve seat to a second predetermined position, a second passage extending axially at least partially through said floating valve seat establishing open fluid pressure communication between said inlet port and said outlet port when the fluid pressure in said fluid inlet port is less than a first predetermined pressure, said differential area piston being movable from said first position to a third position in which said valve head engages said seat portion to close said second passage and hydraulically isolate said inlet port from said outlet port when said inlet port pressure is greater than said first predetermined pressure, said valve head and said seat portion maintaining said isolation when said inlet port pressure is greater than said first predetermined pressure and less than a second predetermined pressure, said differential area piston and said floating valve seat being movable together from their respective said second and third positions to decrease the volume of said outlet port and maintain a first predetermined proportional relation between increases in said inlet port pressure and increases in said outlet port pressure when said inlet port pressure is greater than said first predetermined pressure and less than said second predetermined pressure by operation of said differential area means, said differential area piston being movable by operation of said differential area means away from said seat portion to move said valve head away from said valve member and establish throttled fluid pressure communication between said inlet port and said outlet port through said second passage when said inlet port pressure exceeds said second predetermined pressure, and said differential area means maintaining increases in said inlet port pressure in a second predetermined proportional relation to increases in said outlet port pressure when said inlet port pressure exceeds said second predetermined pressure.

* * * * *